(12) United States Patent
Kim et al.

(10) Patent No.: US 7,724,331 B2
(45) Date of Patent: May 25, 2010

(54) DISPLAY DEVICE AND METHOD

(75) Inventors: Sang-il Kim, Yongin-si (KR); Jeong-ye Choi, Hwaseong-si (KR); Wang-su Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 320 days.

(21) Appl. No.: 11/473,755

(22) Filed: Jun. 23, 2006

(65) Prior Publication Data

US 2007/0024780 A1 Feb. 1, 2007

(30) Foreign Application Priority Data

Jul. 27, 2005 (KR) .................... 10-2005-0068554

(51) Int. Cl.
*G02F 1/1335* (2006.01)
(52) U.S. Cl. .................... 349/119; 349/117
(58) Field of Classification Search .......... 349/117–121
See application file for complete search history.

(56) References Cited

U.S. PATENT DOCUMENTS

| | | | |
|---|---|---|---|
| 6,373,542 B1 | 4/2002 | Yamahara et al. | |
| 2004/0090578 A1* | 5/2004 | Chang et al. | 349/117 |
| 2004/0095536 A1* | 5/2004 | Yoshida et al. | 349/117 |
| 2004/0160559 A1* | 8/2004 | Kim et al. | 349/117 |
| 2005/0140880 A1* | 6/2005 | Lee et al. | 349/117 |
| 2005/0248693 A1* | 11/2005 | Kurasawa | 349/39 |
| 2006/0132686 A1* | 6/2006 | Jeon et al. | 349/117 |
| 2006/0244884 A1* | 11/2006 | Jeon et al. | 349/119 |
| 2007/0200988 A1* | 8/2007 | Kim et al. | 349/119 |

FOREIGN PATENT DOCUMENTS

| | | |
|---|---|---|
| CN | 1116316 A | 2/1996 |
| CN | 1487339 A | 4/2004 |
| CN | 1603906 | 4/2005 |
| CN | 1629684 | 6/2005 |
| JP | 2001343653 | 12/2001 |
| JP | 2003161944 | 6/2003 |
| JP | 2003-262870 A | 9/2003 |
| JP | 2004-163746 | 6/2004 |
| JP | 2005157373 | 6/2005 |
| JP | 2005292302 | 10/2005 |
| JP | 2005338504 | 12/2005 |
| JP | 2006011414 | 1/2006 |
| JP | 2006085203 | 3/2006 |
| JP | 2006098861 | 4/2006 |
| JP | 2006154436 | 6/2006 |
| JP | 2006251050 | 9/2006 |
| JP | 2006267688 | 10/2006 |
| JP | 2006337675 | 12/2006 |
| JP | 2006337676 | 12/2006 |
| KR | 1020030061584 | 7/2003 |
| KR | 1020050031962 | 4/2005 |
| TW | 200519428 | 6/2005 |
| WO | 2005/050269 | 6/2005 |

* cited by examiner

*Primary Examiner*—Uyen-Chau N Le
*Assistant Examiner*—Rhonda S Peace
(74) *Attorney, Agent, or Firm*—Cantor Colburn LLP

(57) ABSTRACT

A transmission-type display device, in which a viewing angle thereof is enhanced, comprises: an panel comprising a first substrate where TFTs are formed and a second substrate facing the first substrate; a first retardation film and a first polarizing plate which adhere sequentially to an external surface of the first substrate; and a second retardation film and a second polarizing plate which adhere sequentially to an external surface of the second substrate.

9 Claims, 13 Drawing Sheets

50 — 160°

41 — 115°

10 — 135°

21 — 25°

30 — 70°

DISPLAY DEVICE AND METHOD

This application claims priority to Korean Patent Application No. 2005-0068554, filed on Jul. 27, 2005, and all the benefits accruing therefrom under 35 U.S.C. §119, and the contents of which in its entirety are herein incorporated by reference.

BACKGROUND OF THE INVENTION

1. Field of the Invention

The present invention relates to a display device, and more particularly, to a transmission-type display device which uses a retardation film to enhance viewing angle.

2. Description of the Related Art

A liquid crystal display ("LCD") device includes an LCD panel comprising a thin film transistor ("TFT") substrate where TFTs are formed, a color filter substrate where color filters are formed, and a liquid crystal layer interposed between both substrates. The LCD panel does not emit light by itself, therefore a backlight unit is provided behind the TFT substrate to irradiate light. Further, polarizing plates adhere to external surfaces of both substrates, respectively, of which transmitting axes of the respective polarizing plates are perpendicular to each other.

The LCD device displays screen images by using an index of refraction anisotropy of the liquid crystal layer. Liquid crystal molecules of the liquid crystal layer rotate relative to an optic axis depending on an applied voltage. Accordingly, transmissivity of light through the liquid crystal layer may be adjusted by controlling a phase difference of light.

The liquid crystal molecules have birefringence that have an index of refraction of a major axis that is different from that of a minor axis. Due to the birefringence, an amount of light and a characteristic of color may vary depending on a position from which a user watches the LCD device, such as from the front or the lateral side. Accordingly, modification of contrast ratio, color shift, gray inversion, or the like may be generated in the LCD device using the liquid crystal molecules.

As display devices having a panel rotatable at 90 degrees for small-size mobile products have been developed, the viewing angle of the LCD device becomes more important. In a twisted nematic ("TN") mode LCD device, the viewing angle from right and left sides is good while the gray inversion of the upper side and the lower side is problem. If the TN mode LCD device uses a wide view film, the viewing angle becomes wider while the gray inversion in the lower side and a diagonal direction is not easily removed.

A vertical alignment ("VA") mode LCD device has been developed to improve the viewing angle and response time, which are problems in the TN mode LCD device. The VA mode LCD device includes an electrode patterned vertical alignment ("PVA") or a pixel divided into multi-domain vertical alignment ("MVA") to enhance the viewing angle. However, both the PVA and MVA involve a complex process of manufacture.

BRIEF SUMMARY OF THE INVENTION

The present invention provides a transmission-type display device and method in which viewing angle is enhanced.

An exemplary embodiment of a display device according to the present invention includes: a panel comprising a first substrate where TFTs are formed and a second substrate facing the first substrate; a first retardation film and a first polarizing plate which adhere sequentially to an external surface of the first substrate; and a second retardation film and a second polarizing plate which adhere sequentially to an external surface of the second substrate.

According to an exemplary embodiment of the invention, the panel further comprises a vertical alignment liquid crystal layer formed between the first substrate and the second substrate.

According to an exemplary embodiment of the invention, the first substrate comprises a first vertical alignment film and the second substrate comprises a second vertical alignment film. The first vertical alignment film and the second vertical alignment film align the liquid crystal layer, respectively.

According to an exemplary embodiment of the invention, the first vertical alignment film and the second vertical alignment film are rubbed.

According to an exemplary embodiment of the invention, the first vertical alignment film and the second vertical alignment film are rubbed anti-parallel to each other.

According to an exemplary embodiment of the invention, a phase retardation value ($\Delta nd$) of the liquid crystal layer is between about 250 nm and about 350 nm.

According to an exemplary embodiment of the invention, one of the first retardation film and the second retardation film comprises a $\lambda/4$ film and a C-plate and the other thereof comprises a $\lambda/4$ film.

According to an exemplary embodiment of the invention, the first retardation film comprises a $\lambda/4$ film and the second retardation film comprises a C-plate.

According to an exemplary embodiment of the invention, the first retardation film and the second retardation film comprise a biaxial $\lambda/4$ film, respectively.

According to an exemplary embodiment of the invention, a $R_{th}$ of the biaxial $\lambda/4$ film is between about 100 nm and about 140 nm.

According to an exemplary embodiment of the invention, the first retardation film comprises a biaxial $\lambda/4$ film. A slow axis of the biaxial $\lambda/4$ film inclines at an angle of about 45 degrees to a transmitting axis of the first polarizing plate.

According to an exemplary embodiment of the invention, the second retardation film comprises a biaxial $\lambda/4$ film. A slow axis of the biaxial $\lambda/4$ film inclines at an angle of about 45 degrees to a transmitting axis of the second polarizing plate.

According to an exemplary embodiment of the invention, the first retardation film comprises a first biaxial $\lambda/4$ film and the second retardation film comprises a second biaxial $\lambda/4$ film. A slow axis of the first biaxial $\lambda/4$ film is perpendicular to a slow axis of the second biaxial $\lambda/4$ film.

According to an exemplary embodiment of the invention, the first retardation film comprises a $\lambda/4$ film, and a slow axis of the $\lambda/4$ film inclines at an angle of about 45 degrees to a transmitting axis of the first polarizing plate.

According to an exemplary embodiment of the invention, the second retardation film comprises a $\lambda/4$ film, and a slow axis of the $\lambda/4$ film inclines at an angle of about 45 degrees to a transmitting axis of the second polarizing plate.

According to an exemplary embodiment of the invention, the first retardation film and the second retardation film comprise a $\lambda/4$ film, respectively, and a $R_o$ of the $\lambda/4$ film is between about 100 nm and about 140 nm.

According to an exemplary embodiment of the invention, the first retardation film comprises a first $\lambda/4$ film and the second retardation film comprises a second $\lambda/4$ film. A slow axis of the first $\lambda/4$ film is perpendicular to the transmitting axis of the second $\lambda/4$ film.

According to an exemplary embodiment of the invention, at least one of the first retardation film and the second retardation film comprises a C-plate, and $R_{th,total}$ of the C-plate is between about 100 nm and about 340 nm.

Another exemplary embodiment includes a method of forming a display device. The method comprises: forming TFTs on a first substrate; disposing a second substrate to face the first substrate; adhering sequentially a first retardation film and a first polarizing plate to an external surface of the first substrate; adhering sequentially a second retardation film and a second polarizing plate to an external surface of the second substrate; and forming a vertical alignment liquid crystal layer between the first substrate and the second substrate.

According to an exemplary embodiment of the invention, a phase retardation value (Δnd) of the liquid crystal layer is between about 250 nm and about 350 nm.

Additional features of the invention will be set forth in the detailed description which follows, and in part will be apparent from the detailed description, or may be learned by practice of the invention.

BRIEF DESCRIPTION OF THE DRAWINGS

The accompanying drawings, which are included to provide a further understanding of the invention and are incorporated in and constitute a part of this specification, illustrate exemplary embodiments of the present invention and together with the description serve to explain the principles of the invention.

DETAILED DESCRIPTION OF THE INVENTION

Figure 1:
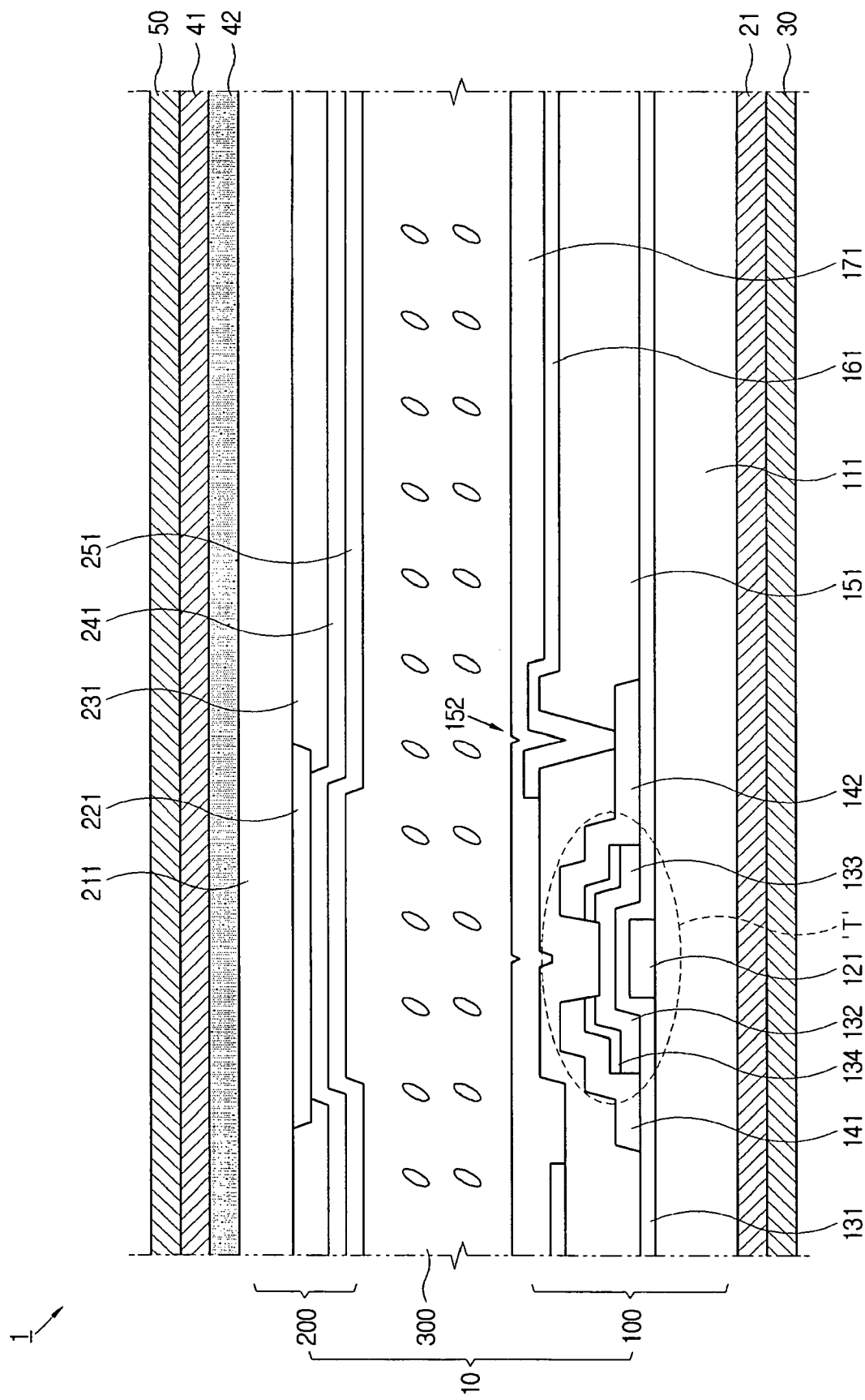
FIG. 1 is a cross-sectional view of a first exemplary embodiment of an LCD device according to the present invention.

The exemplary embodiments of the present invention will now be described with reference to the attached drawings. The present invention may, however, be embodied in different forms and thus the present invention should not be construed as being limited to the exemplary embodiments set forth herein. Rather, these exemplary embodiments are provided so that this disclosure will be thorough and complete, and will fully convey the scope of the invention to those skilled in the art.

In the drawings, the thickness of the layers, films, and regions are exaggerated for clarity. When an element such as a layer, film, region, or substrate is referred to as being "on" another element, it can be directly on the other element or intervening elements may also be present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a first embodiment of an LCD device according to the present invention. An LCD device 1 includes an LCD panel 10, a first λ/4 film 21 and a first polarizing plate 30 which sequentially adhere, respectively, to one side of the LCD panel 10, and a C-plate 42, a second λ/4 film 41 and a second polarizing plate 50 which sequentially adhere, respectively, to another side of the LCD panel 10. The LCD panel 10 includes a TFT substrate 100, a color filter substrate 200 facing the TFT substrate 100, and a liquid crystal layer 300 interposed between both substrates 100 and 200.

Figure 2:
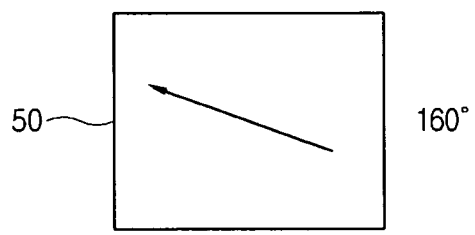
FIG. 2 is an exploded schematic perspective view of the first exemplary embodiment of an LCD device according to the present invention.
Figure 2:
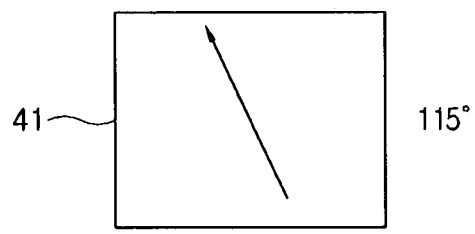
Figure 2:
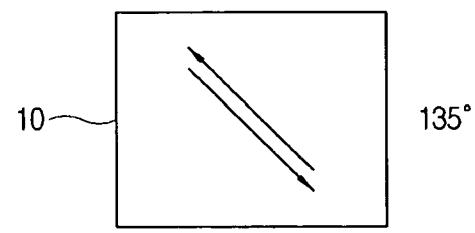
Figure 2:
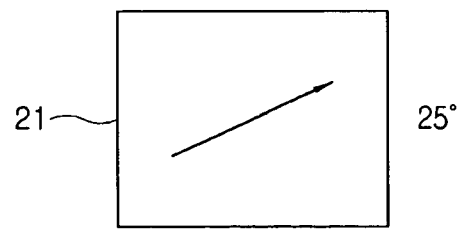
Figure 2:
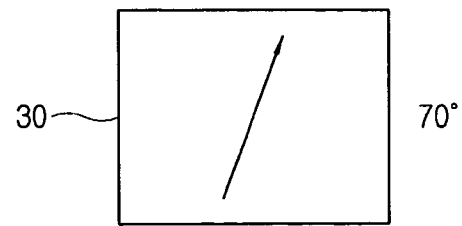

FIG. 2 is an exploded schematic perspective view of the first exemplary embodiment of an LCD device according to the present invention.

The arrows shown in the LCD panel 10 represent the rubbing direction of a homeotropic alignment films 171 and 251. The arrows shown in the λ/4 films 21 and 41 represent the slow axis of the λ/4 films 21 and 41. The arrows shown in the polarizing plates 30 and 50 represent transmitting axis the polarizing plates 30 and 50.

First, the TFT substrate 100 will be described in the following.

The TFT substrate 100 is formed on a first insulating substrate 111. The substrate 100 includes a gate electrode 121, a gate insulating layer 131 covering the gate electrode 121, a semiconductor layer 132 and an ohmic contact layer 133 which are formed in an island shape over the gate electrode 121, and a source electrode 141 and a drain electrode 142 which are separated from each other across the gate electrode 121 to form a channel area.

The gate electrode 121 may be a single-layer, a double-layer or a triple layer. When formed in a single-layer, the gate electrode 121 is made of aluminum or alloy of aluminum and neodymium. When formed in a double-layer, the gate electrode 121 is made of chrome, molybdenum or alloy of molybdenum for the lower layer, which is excellent in physical and chemical properties, and aluminum or alloy of aluminum for the upper layer, which has low resistivity.

The gate insulating layer 131 is made of silicon nitride (SiNx).

The semiconductor layer 132 is made of hydrogenated amorphous silicon. The ohmic contact layer 133 is made of n+ hydrogenated amorphous silicon, which is highly doped with n-type impurities. The ohmic contact layer 133 is divided into two, and the gate electrode 121 is disposed between the two sections of the ohmic contact layer 133.

The source electrode 141 and the drain electrode 142 may also be formed in a single-layer, a double-layer or a triple-layer. When formed in a single-layer, the source electrode 141 and the drain electrode 142 are made of aluminum or alloy of aluminum and neodymium. When formed in a double-layer, the source electrode 141 and the drain electrode 142 are made of chrome, molybdenum or alloy of molybdenum for the lower layer, which is excellent in physical and chemical properties, and aluminum or alloy of aluminum for the upper layer, which has low resistivity.

A passivation film 151 is formed on the TFT substrate 100. The passivation film 151 covers the channel area between the source electrode 141 and the drain electrode 142 to protect the channel area. A contact hole 152 is formed on the passivation film 151 to expose the drain electrode 142.

A pixel electrode 161 is formed of indium tin oxide (ITO) or indium zinc oxide (IZO) on the passivation film 151. The pixel electrode 161 is connected to the drain electrode 142 through the contact hole 152.

A first homeotropic alignment film 171 is formed on the pixel electrode 161. The first homeotropic alignment film 171 aligns the liquid crystal layer 300 vertically along with a second homeotropic film 251 of the color filter substrate 200. The first homeotropic alignment film 171 and the second homeotropic alignment film 251 are rubbed. The rubbing directions of homeotropic alignment films 171 and 251 are anti-parallel to each other. The liquid crystal layer 300 has a predetermined pre-tilt angle due to the rubbed homeotropic alignment films 171, 251 and lies in a regular direction when an electric field is applied.

Next, the color filter substrate 200 will be described in the following.

A black matrix 221 is formed on a second insulating substrate 211. The black matrix 221 is disposed between red, green and blue filters to divide the filters, and prevents light irradiating directly to the TFT disposed on the first substrate 100.

The black matrix 221 is typically made of a photoresist organic substance containing a black pigment. The black pigment may be carbon black, titanium oxide or the like.

A color filter layer 231 includes a red, a green and a blue filters which are repeatedly disposed and separated by the black matrix 221. The color filter layer 231 endows colors to light irradiated from the backlight unit (not shown) and passing through the liquid crystal layer 300.

A common electrode 241 is formed on the color filter layer 231. The common electrode 241 is made of ITO or IZO. The common electrode 241 applies a voltage to the liquid crystal layer 300 along with the pixel electrode 161 of the TFT substrate 100.

The second homeotropic alignment film 251 is formed on the common electrode 241. The second homeotropic alignment film 251 aligns the liquid crystal layer 300 vertically along with the first homeotropic alignment film 171.

The liquid crystal layer 300 is disposed between the TFT substrate 100 and the color filter substrate 200. The liquid crystal molecules of the liquid crystal layer 300 have negative dielectric anisotropy, and are a VA mode, of which a major axis is vertical to the substrates 100, 200 due to the homeotropic alignment films 171, 251 when the voltage is not applied. The liquid crystal molecules of the liquid crystal layer 300 have a predetermined pre-tilt angle due to the rubbed homeotropic alignment films 171, 251, thereby lying in a regular direction when an electric field is applied. The liquid crystal layer 300 has a wide viewing angle, because the liquid crystal molecules are aligned vertically to the substrates 100, 200.

Figure 3:
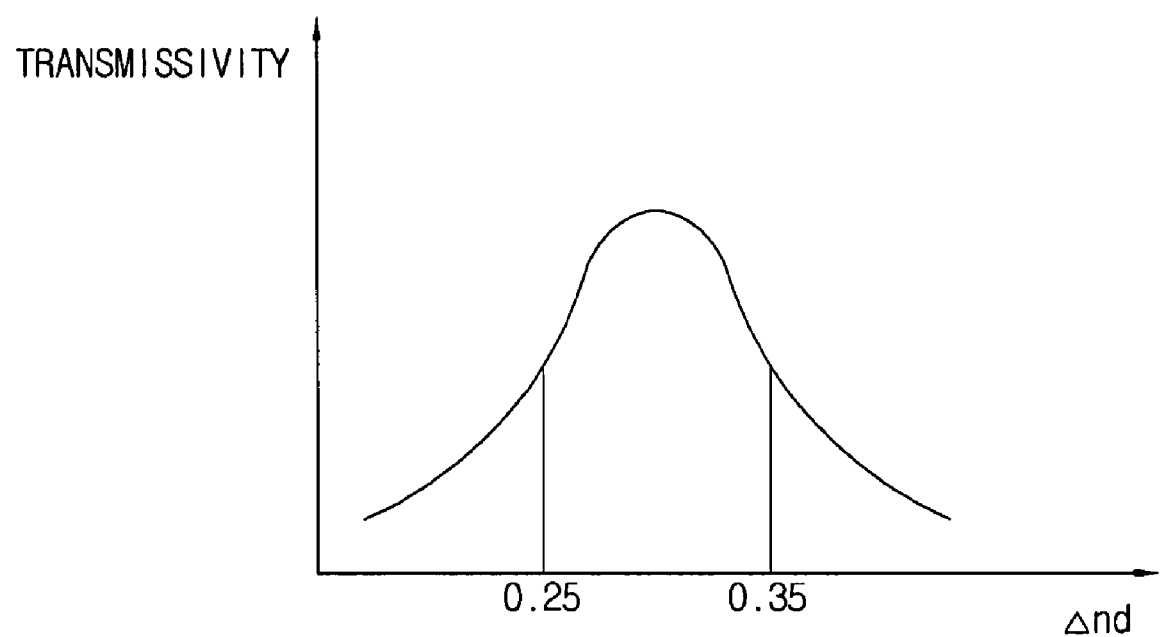
FIG. 3 is a graph showing phase retardation value versus transmissivity of a liquid crystal layer.

Preferably, a phase retardation value of the liquid crystal layer 300, expressed as $\Delta n * d$ ($\Delta n$: dielectric anisotropy, d: cell gap), is between about 250 nm and about 350 nm. If the phase retardation value of the liquid crystal layer 300 is about 250 nm or less, transmissivity becomes lowered. If the phase retardation value of the liquid crystal layer 300 is about 350 nm or more, the transmissivity becomes lowered and the display screen may become yellowish. The phase retardation value versus the transmissivity is shown in FIG. 3.

The above-described LCD panel 10 will be characterized in more detail below.

First, the LCD panel 10 is transmission-type since a reflecting layer is not formed on the TFT substrate 100. The reflecting layer is typically made of metal having excellent reflectance, such as aluminum, and reflects light incident from the outside of the color filter substrate 200. The LCD panel 10 may include the reflecting layer to be a reflectance-type LCD panel or a trans-transmission-type LCD panel. The reflectance-type or trans-transmission-type LCD panel should include an organic layer to enhance reflectance, of which an upper part is formed in a lenticular shape (e.g., shape of a double-convex lens). In exemplary embodiments of the present invention, the LCD panel 10 is a transmission-type so that the reflecting layer and the organic layer do not need to be formed. Accordingly, a manufacturing process thereof is simplified.

Second, neither cutting patterns nor projections are formed on the pixel electrode 161 and the common electrode 241. A PVA mode LCD panel includes cutting patterns on the pixel electrode and the common electrode so that liquid crystal molecules have a pre-tilt angle. An MVA mode LCD panel includes projections on the pixel electrode and the common electrode so as to form a multi-domain. In exemplary embodiments of the present invention, the liquid crystal molecules have the pre-tilt angle due to the simple process of rubbing the homeotropic alignments 171, 251 without forming the cutting patterns nor the projections.

Hereinbelow, retardation films 21, 41, 42 and the polarizing plates 30, 50 will be described, which adhere to both sides of the LCD panel 10.

Provided that a z-axis is vertical to the LCD panel, an x-axis and y-axis are in a plane of the LCD panel, and nx, ny and nz are indexes of refraction of molecules of which the retardation films in the x, y, z directions, respectively, the λ/4 film indicates the case of nx>ny=nz, and a C-plate indicates the case of nx=ny>nz.

The λ/4 film is a retardation film endowing retardation of ¼ wavelength (140±40 nm) to transmitted light and x-axis of the λ/4 film is a slow axis. The λ/4 film converts circularly polarized light into linearly polarized light, and converts linearly polarized light into circularly polarized light.

The first λ/4 film 21 and the first polarizing plate 30 adhere sequentially to an external surface of the TFT substrate 100. In particular, the first λ/4 film 21 adheres to the external surface of the TFT substrate 100 and the first polarizing plate 30 adheres to the first λ/4 film 21, as illustrated.

The slow axis of the first λ/4 film 21 inclines at an angle of about 45 degrees to a transmitting axis of the first polarizing plate 30 so as to prevent light leaking under a black condition.

The C-plate 42, the second λ/4 film 41 and a second polarizing plate 50 adhere sequentially to an external surface of the color filter substrate 200. In particular, the C-plate 42 adheres to the external surface of the color filter substrate 200, the second λ/4 film 41 adheres to the C-plate 42 and the second polarizing plate 50 adheres to the second λ/4 film.

Preferably, the phase retardation of the thickness $R_{th}$ of the C-plate 42 is between about 100 nm 340 nm. $R_{th}$ is defined as $[(n_x+n_y)/2-n]\times d$, and d is a thickness of the C-plate 42. If $R_{th}$ of the C-plate 42 is about 100 nm or less, the transmissivity is lowered, and if the $R_{th}$ of the C-plate 42 is about 340 nm or more, the viewing angle becomes defective and the display screen may become yellowish.

The slow axis of the second λ/4 film 41 inclines at an angle of about 45 degrees to a transmitting axis of the second polarizing plate 50 so as to prevent light leaking under the black condition. Further, the slow axis of the first λ/4 film 21 is perpendicular to the slow axis of the second λ/4 film 41 so as to prevent light leaking under the black condition. The transmitting axis of the first polarizing plate 30 is perpendicular to the transmitting axis of the second polarizing plate 50.

Preferably, the phase retardation within the surface $R_o$ of the first λ/4 film 21 and $R_o$ of the second λ/4 film 41 are between about 100 nm and about 140 nm, respectively. Here, $R_o$ of the first λ/4 film 21 of the second λ/4 film 41 is defined as $(n_x-n_y)\times d$, and d is a thickness of λ/4 films 21, 41, respectively. If $R_o$s of the λ/4 films 21, 41 are about 100 nm or less, the transmissivity is lowered, and if the $R_o$s of the λ/4 films 21, 41 are about 140 nm or more, the viewing angle becomes defective and the screen may become yellowish.

The following graphs in FIGS. 4 through 6 illustrate transmissivity of each gray scale versus viewing angle according to results from simulations in several exemplary embodiments of LCDs.

Figure 4A:
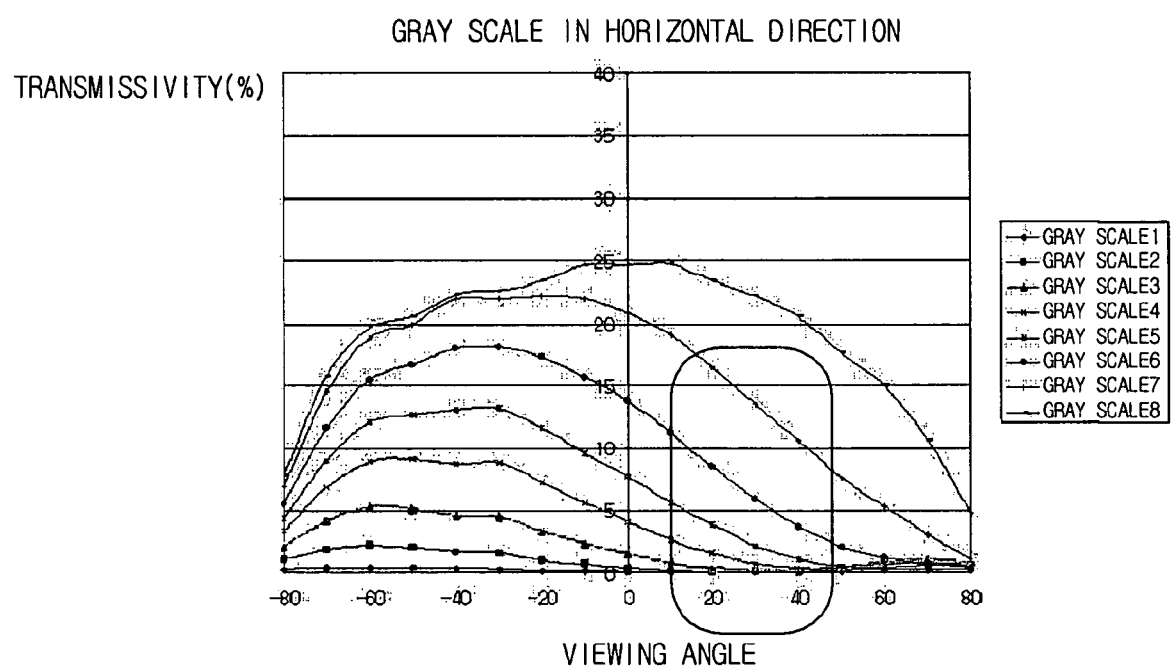
FIGS. 4A and 4B are graphs showing transmissivity of each gray scale in the horizontal direction and vertical directions, respectively, versus viewing angle in a TN mode LCD device.
Figure 4B:
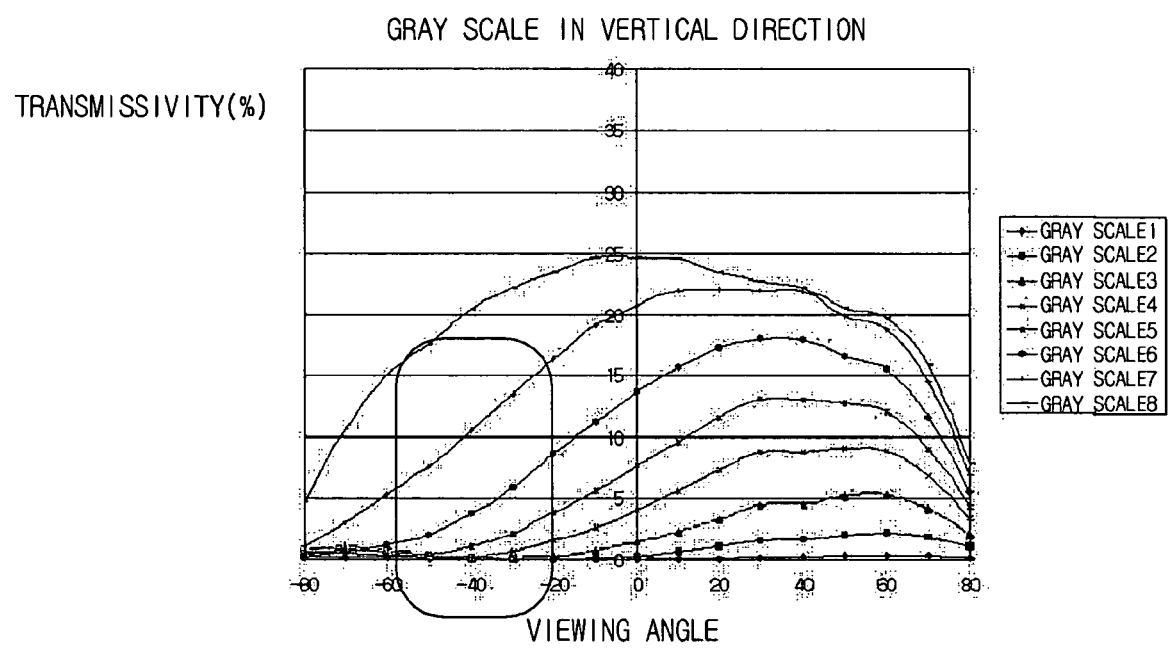
Figure 5A:
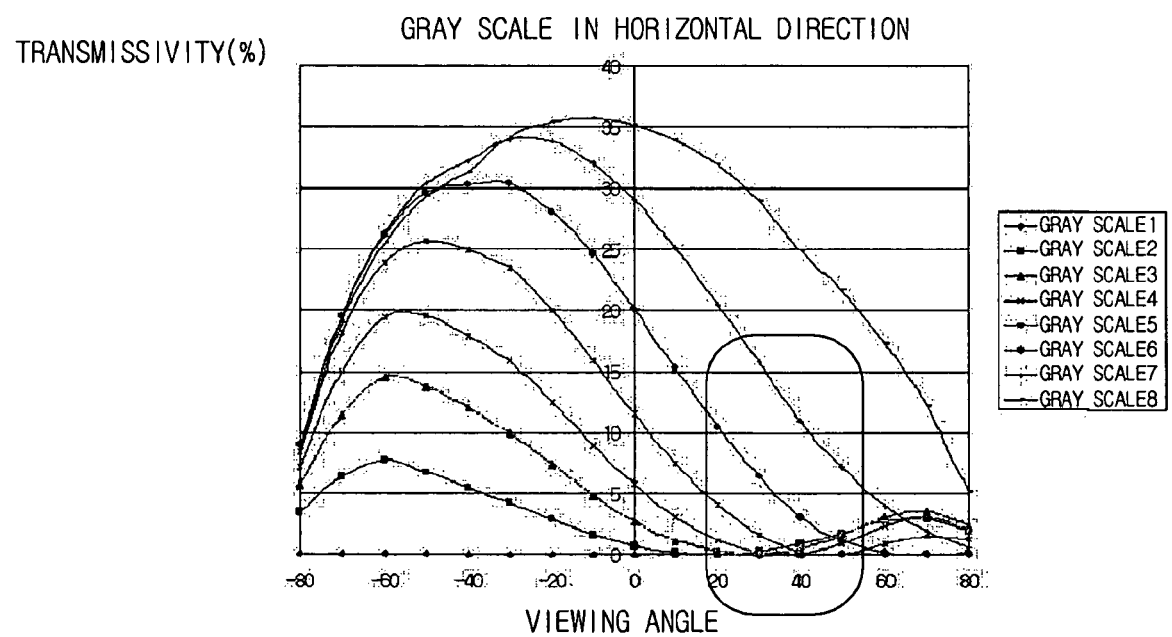
FIGS. 5A AND 5B are graphs showing transmissivity of each gray scale in the horizontal direction and vertical directions, respectively, versus viewing angle in a VA mode LCD device.
Figure 5B:
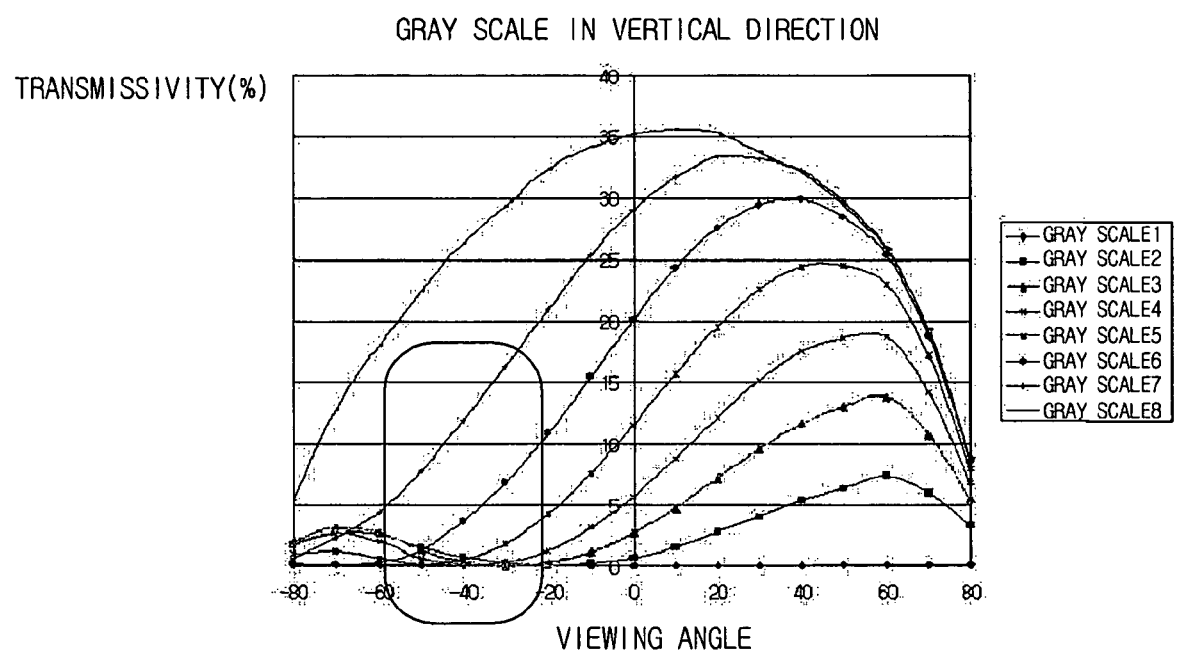
Figure 6A:
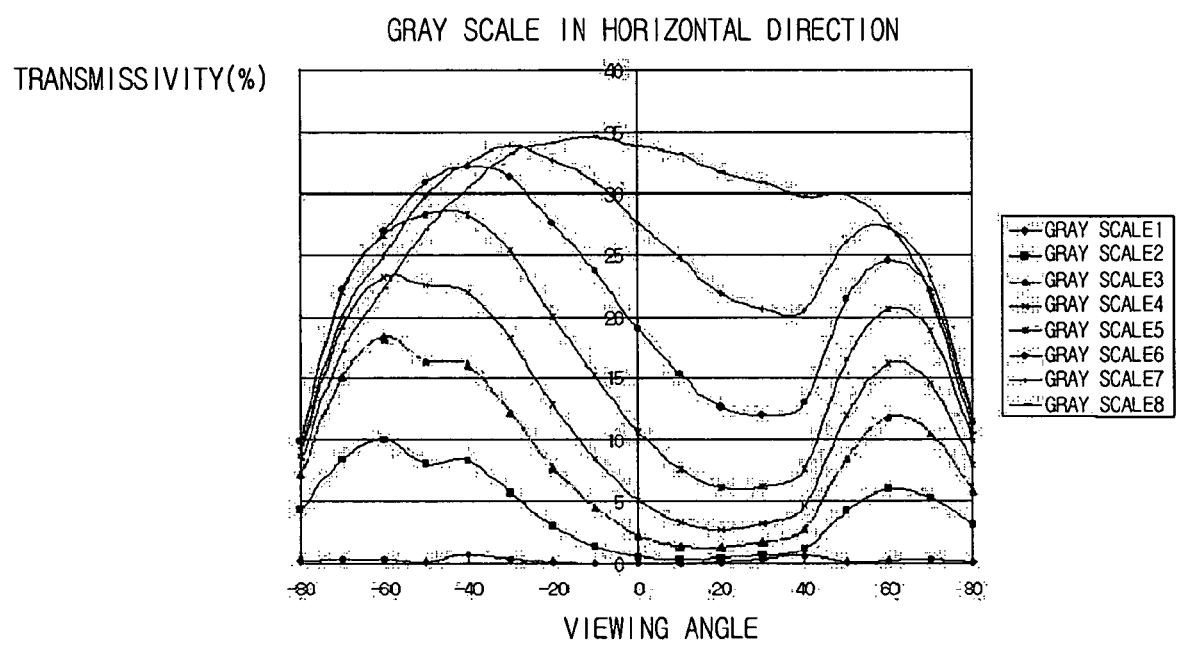
FIGS. 6A and 6B are graphs showing transmissivity of each gray scale versus in the horizontal direction and vertical directions, respectively, viewing angle in the first exemplary embodiment of the LCD device according to the present invention.
Figure 6B:
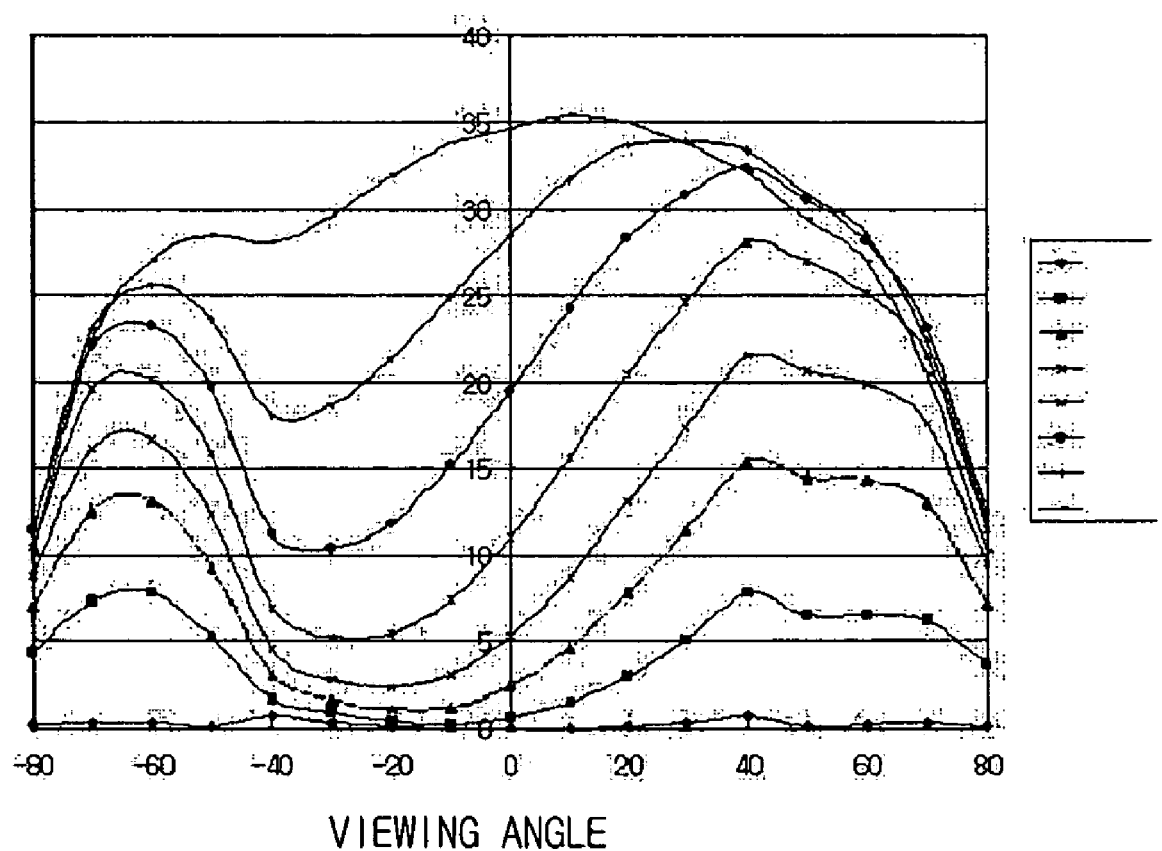

FIGS. 4A and 4B are graphs showing transmissivity of each gray scale in the horizontal direction and vertical directions, respectively, versus viewing angle in a TN mode LCD device. FIGS. 5A and 5B are graphs showing transmissivity of each gray scale in the horizontal direction and vertical directions, respectively, versus viewing angle in a VA mode LCD device. FIGS. 6A and 6B are graphs showing transmissivity of each gray scale in the horizontal direction and vertical directions, respectively, versus viewing angle in the LCD device according to the first exemplary embodiment of the present invention.

FIGS. 4A and 4B are from the TN mode LCD device employing a wide view film with a discotic liquid crystal layer. The liquid crystal layer is Δnd of 360 nm, and is twisted at 90 degrees while the electric field is not applied. The vertical alignment film of the color filter substrate is rubbed at 270 degrees, and the vertical alignment film of the TFT substrate is rubbed at 180 degrees, thereby being at 90 degrees of the rubbing direction therebetween. The transmitting axis of the polarizing plate of the color filter substrate is at 0 degrees, and the transmitting axis of the polarizing plate of the TFT substrate is at 90 degrees, thereby being at 90 degrees therebetween.

FIGS. 4A and 4B show a marked area where gray inversion is generated in both the horizontal direction and the vertical direction, respectively.

FIGS. 5A and 5B are from the VA mode LCD device in which the vertical alignment film is rubbed. The liquid crystal layer is Δnd of 360 nm, and is twisted at 0 degrees. Both the vertical alignment film of the color filter substrate and the vertical alignment film of the TFT substrate are rubbed respectively at 135 degrees, and are anti-parallel to each other. The C-plate having 120 nm of $R_{th}$ adheres only to the external surface of the color filter substrate. The transmitting axis of the polarizing plate is at 0 degrees in the color filter substrate side, and at 90 degrees in the TFT substrate side, thereby being 90 degrees therebetween.

FIGS. 5A and 5B show a marked area where gray inversion is generated in both the horizontal direction and the vertical direction, respectively.

FIGS. 6A and 6B are from the VA mode LCD device in which the vertical alignment film is rubbed. The liquid crystal layer is Δnd of 340 nm, and is twisted at 0 degrees. Both the vertical alignment film of the color filter substrate and the vertical alignment film of the TFT substrate are rubbed respectively at 135 degrees, and are anti-parallel to each other.

As mentioned in FIGS. 1 and 2, the λ/4 film and the polarizing plate adhere sequentially to the external surface of the TFT substrate; and the C-plate, the λ/4 film, and the polarizing plate adhere sequentially to the external surface of the color filter substrate. The transmitting axis of the polarizing plate is at 160 degrees in the color filter substrate side, and at 0 degrees in the TFT substrate side, thereby being 90 degrees therebetween. $R_{th}$ of the C-plate is 120 nm, $R_o$ of each λ/4 film is 120 nm.

FIGS. 6A and B do not show remarkable gray inversion in the horizontal or in the vertical directions. The gray inversion is observed a little bit around −60 degrees in the horizontal direction, which is removed by adjusting Δnd of the liquid crystal layer.

FIGS. 7 through 10 are schematic cross-sectional views of second through fifth exemplary embodiments of an LCD device according to the present invention. In each of the exemplary embodiments of FIGS. 7 through 10, an LCD panel 10 includes a color filter substrate disposed in the upper part and a TFT substrate in the lower part, and is a transmission-type VA mode including a rubbed vertical alignment film.

Figure 7:
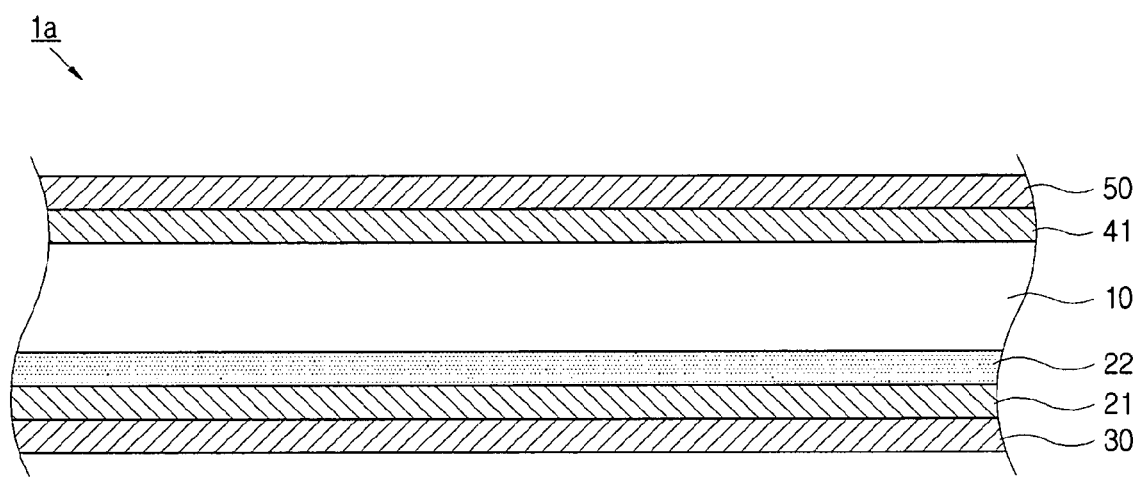
FIGS. 7 through 10 are schematic cross-sectional views of respective second through fifth exemplary embodiments of an LCD device according to the present invention.

In an LCD device 1a shown in FIG. 7, a C-plate 22, a first λ/4 film 21, and a first polarizing plate 30 adhere sequentially and respectively to a TFT substrate. Further, a second λ/4 film 41 and the second polarizing plate 50 adhere sequentially and respectively to a color filter substrate.

Figure 8:
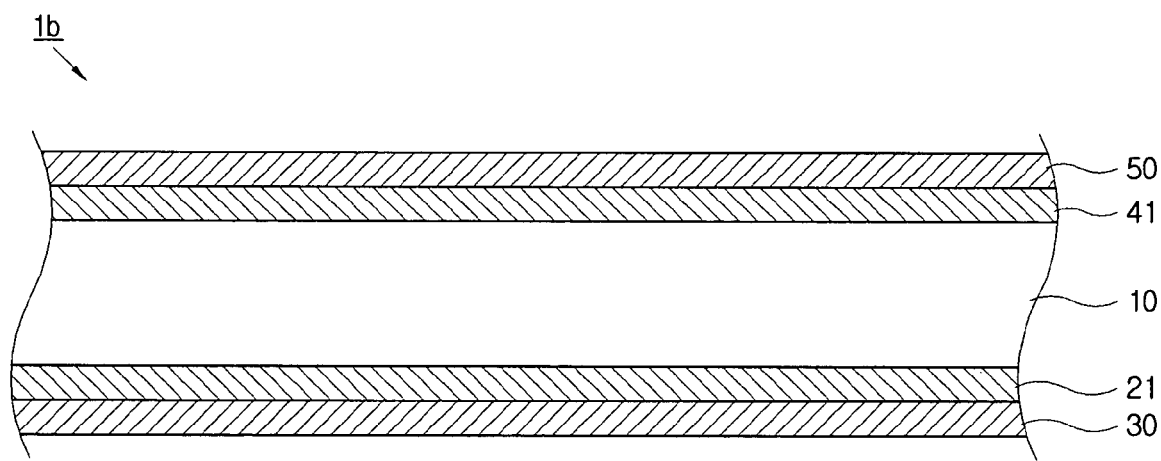

In an LCD device 1b shown in FIG. 8, a first λ/4 film 21 and a first polarizing plate 30 adhere sequentially and respectively to a TFT substrate. Further, a second λ/4 film 41 and a second polarizing plate 50 adhere sequentially and respectively to a color filter substrate.

Figure 9:
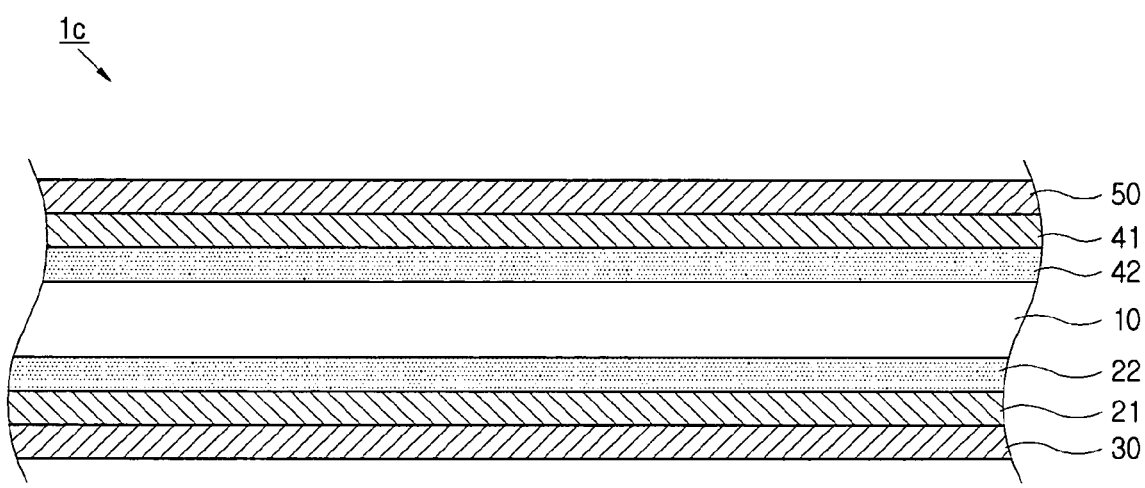

In an LCD device 1c shown in FIG. 9, a first C-plate 22, a first λ/4 film 21, and a first polarizing plate 50 adhere sequentially and respectively to a TFT substrate. Further, a second C-plate 42, a second λ/4 film 41 and the second polarizing plate 50 adhere sequentially and respectively to a color filter substrate. Preferably, a total phase retardation of the thickness $R_{th, total}$ of $R_{th}$ of the first C-plate 22 and $R_{th}$ of the second C-plate 42 is between about 100 nm and about 340 nm. If $R_{th, total}$ of the C-plates 22, 42 is less than about 100 nm or more than about 340 nm, viewing angle may become defective.

Figure 10:
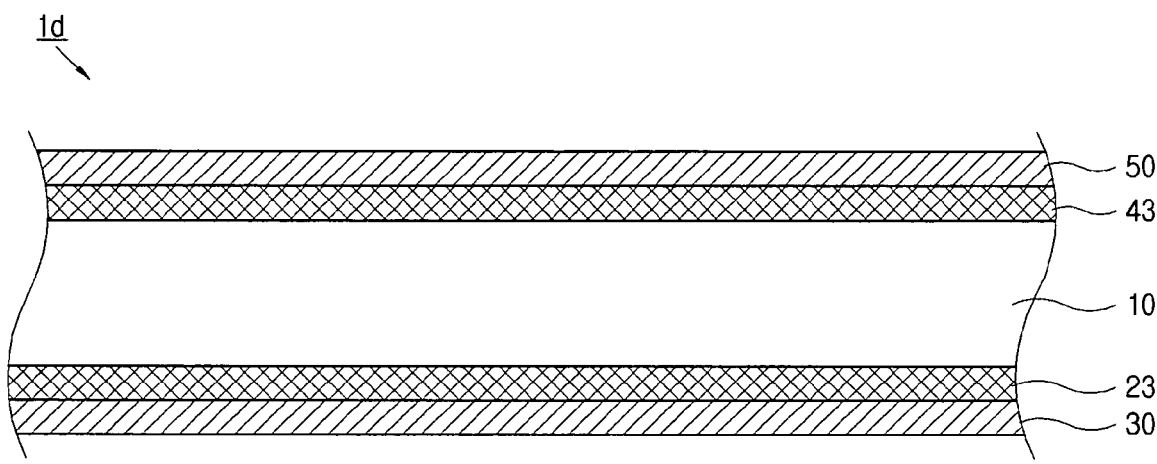

In an LCD device 1d shown in FIG. 10, a first biaxial λ/4 film 23 and a first polarizing plate 30 adhere sequentially and respectively to a TFT substrate. Further, a second biaxial λ/4 film 43 and a second polarizing plate 50 adhere sequentially and respectively to a color filter substrate.

Provided that the z-axis is vertical to the LCD panel 10, the x-axis and y-axis are in the plane of the LCD panel 10, and nx, ny and nz are refractivities of molecules of which the retardation films are comprised in the x, y, z directions, respectively, the biaxial λ/4 film 23, 43 indicates the case of nx>ny>nz. Preferably, $R_o$ of the biaxial λ/4 films is between about 100 nm and about 140 nm. If the $R_o$ of the biaxial λ/4 film 23, 43 is about 100 nm or less, transmissivity becomes lowered, and if the $R_o$ of the biaxial λ/4 film 23, 43 is about 140 nm or more, the viewing angle becomes defective and the display screen may become yellowish.

A slow axis of the first biaxial λ/4 film 23 inclines at an angle of about 45 degrees to a transmitting axis of the first polarizing plate 30, and a slow axis of the second biaxial λ/4 film 43 inclines at an angle of about 45 degrees to a transmitting axis of the second polarizing plate 50 so as to prevent light leaking under black condition.

The LCD device according to the present invention may be used for a small-size product such as a cellular phone, a tablet computer, a sub-notebook, or the like, and which is rotatable to at least 90 degrees.

It will be apparent to those skilled in the art that various modifications and variations can be made in the present invention without departing from the spirit or scope of the invention. Thus it is intended that the present invention cover the modifications and variations of the present invention provided they come within the scope of the appended claims and their equivalents.

What is claimed is:

1. A display device comprising:
   a first substrate where TFTs are formed;
   a second substrate facing the first substrate;
   a vertical alignment liquid crystal layer formed between the first substrate and the second substrate;
   a first retardation film and a first polarizing plate which adhere sequentially to an external surface of the first substrate; and
   a second retardation film and a second polarizing plate which adhere sequentially to an external surface of the second substrate,
   wherein one of the first retardation film and the second retardation film comprises a λ/4 film and a C-plate and the other thereof comprises a λ/4 film,
   the first substrate comprises a first vertical alignment film,
   the second substrate comprises a second vertical alignment film,
   rubbing directions of the first vertical alignment film and the second vertical alignment film are opposite to each other, and
   the vertical alignment liquid crystal layer has a predetermined pre-tilt angle due to the first vertical alignment film and the second vertical alignment film.

2. The display device according to claim 1, wherein a phase retardation value (Δnd) of the liquid crystal layer is between about 250 nm and about 350 nm.

3. The display device according to claim 2, wherein a Rth of each λ/4 film is between about 100 nm and about 140 nm.

4. The display device according to claim 3, wherein the first retardation film comprises a λ/4 film and a slow axis of the λ/4 film inclines at an angle of about 45 degrees to a transmitting axis of the first polarizing plate.

5. The display device according to claim 4, wherein the second retardation film comprises a λ/4 film and a slow axis of the λ/4 film inclines at an angle of about 45 degrees to a transmitting axis of the second polarizing plate.

6. The display device according to claim 5, wherein a direction of the rubbing inclines at an angle of about 65 degrees to one of the transmitting axis of the first polarizing plate and the transmitting axis of the second polarizing plate, and
   the transmitting axis of the first polarizing plate is perpendicular to the transmitting axis of the second polarizing plate.

7. The display device according to claim 4, wherein the first retardation film and the second retardation film each comprise a λ/4 film, and a $R_o$ of each λ/4 film is between about 100 nm and about 140 nm.

8. The display device according to claim 7, wherein the first retardation film comprises a first λ/4 film and the second retardation film comprises a second λ/4 film, and a slow axis of the first λ/4 film is perpendicular to the transmitting axis of the second λ/4 film.

9. The display device according to claim 4, wherein Rth, total of the C-plate is between about 100 nm and about 340 nm.

* * * * *